United States Patent [19]

Picard

[11] Patent Number: 4,965,441
[45] Date of Patent: Oct. 23, 1990

[54] METHOD FOR THE SCANNING CONFOCAL LIGHT-OPTICAL MICROSCOPIC AND INDEPTH EXAMINATION OF AN EXTENDED FIELD AND DEVICES FOR IMPLEMENTING SAID METHOD

[75] Inventor: Bernard Picard, Saint Martin D'Heres, France

[73] Assignee: Commissariat a l'Energie Atomique, France

[21] Appl. No.: 302,479

[22] Filed: Feb. 26, 1989

[30] Foreign Application Priority Data

Jan. 27, 1988 [FR] France .................... 88 00934

[51] Int. Cl.⁵ .............................................. G01J 1/20
[52] U.S. Cl. .................................. 250/201.3; 350/527
[58] Field of Search ............ 250/234, 216, 201, 201.3; 350/526, 527

[56] References Cited

U.S. PATENT DOCUMENTS

| 4,515,447 | 5/1985 | Weimer | 350/527 |
| 4,530,578 | 7/1985 | Kato | 350/526 |
| 4,734,578 | 3/1988 | Horikawa | 250/234 |
| 4,843,242 | 6/1989 | Doyle | 350/527 |

FOREIGN PATENT DOCUMENTS

| 0108497 | 5/1984 | European Pat. Off. . |
| 0167410 | 7/1984 | European Pat. Off. . |
| 0183415 | 6/1986 | European Pat. Off. . |
| 3447467 | 7/1986 | Fed. Rep. of Germany . |
| 3610165 | 10/1986 | Fed. Rep. of Germany . |
| WO87/03957 | 7/1987 | PCT Int'l Appl. . |
| 2152697 | 8/1985 | United Kingdom . |

Primary Examiner—David C. Nelms
Assistant Examiner—Sherrie Hsia

[57] ABSTRACT

Method for the scanning confocal light-optical microscopic and in-depth examination of an extended field and devices for implementing said method. The method consists of forming a principal luminous beam made up of a plurality of secondary luminous beams distinguished from each other by means of at least one of their characteristics, directing the principal luminous beam towards focussing means (30), focussing onto an object to be examined by means of the focussing means (30) at points of different altitude the various secondary luminous beams, sending back the secondary luminous beams reflected by the object to be examined towards a detection system (20), detecting the intensity of the secondary beams, digitally analyzing and processing the signals detected, and of carrying out a scanning of the principal luminous beam as regards all of the object to be studied.

Application for microelectronics inspection.

16 Claims, 4 Drawing Sheets

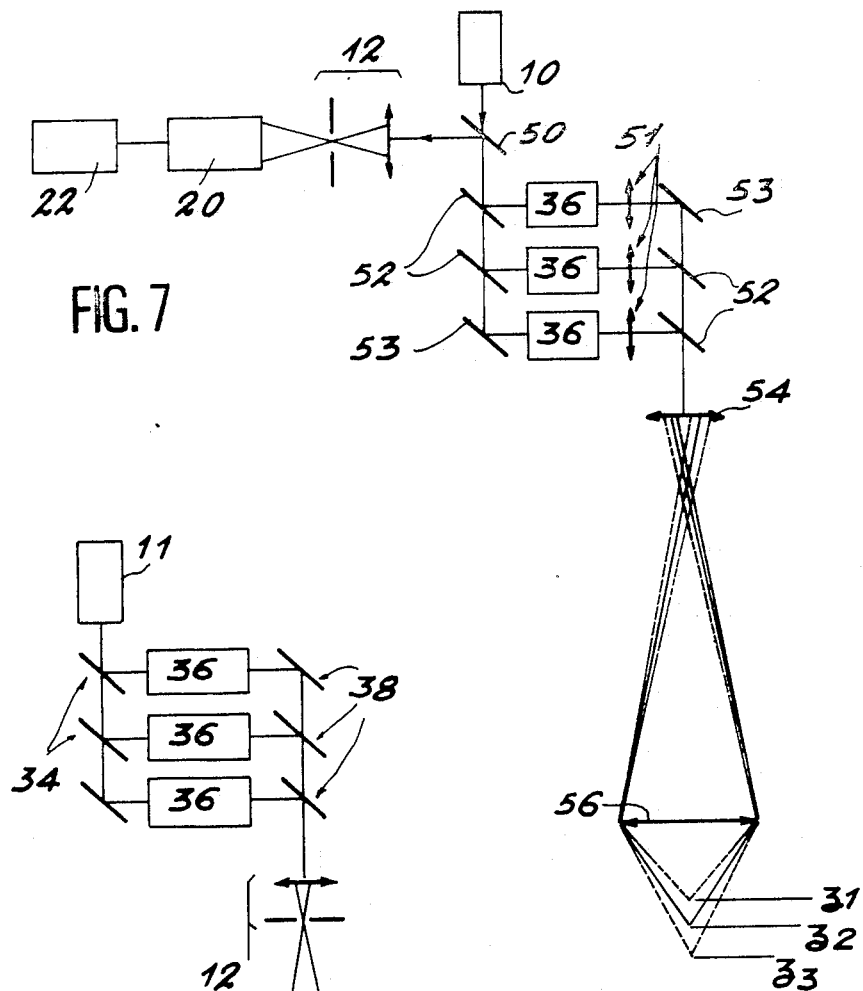
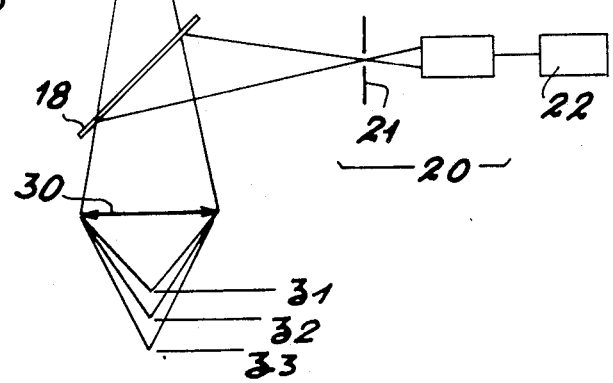
FIG. 7
FIG. 5

METHOD FOR THE SCANNING CONFOCAL LIGHT-OPTICAL MICROSCOPIC AND INDEPTH EXAMINATION OF AN EXTENDED FIELD AND DEVICES FOR IMPLEMENTING SAID METHOD

FIELD OF THE INVENTION

The present invention concerns a method for the scanning confocal light-optical microscopic and in-depth examination of an extended field and devices for implementing said method.

BACKGROUND OF THE INVENTION

In particular, it applies to in-depth extended field microscopic optical image formation carried out at a high speed and especially to microelectronics inspection.

Generally speaking, in order to carry out scanning confocal optical microscopy, the procedure is as follows: a luminous beam is formed which is directed towards a focussing system.

By means of this focussing system, the beam is focussed onto the object to be studied.

By means of a separating plate, a light beam reflected by the object to be examined is sent to a system for the digital detection, analysis and processing of the detected signal.

The light intensity sent by the separating plate is detected and the detected signals are digitally analysed and processed.

A scanning of the luminous beam is carried out on the object to be studied, either by moving the luminous beam with the object being fixed, or by moving the object with the beam being fixed.

A known device enabling this method to be implemented is diagrammatically shown on FIG. 1.

A luminous beam delivered by a monochromatic luminous source 10, such as a laser, is spatially filtered and focussed by focussing means 12, focussing being effected with, for example, a lens, and filtering being effected with, for example, a diaphragm. This makes it possible to obtain an intensity uniformly distributed over the section of the beam. The beam is then refocussed onto the object 16 to be studied by focussing means 14, such as a lens. The beam is reflected by the object to be examined and sent back by a separating plate 18 to a detection system 20 connected to a system for the digital analysis and processing of the signals detected. The detection system 20 comprises a diaphragm 21 placed at a conjugated point of the focal point of the focussing means 14. The image obtained after digital processing represents the reflectivity variations of the object 16 to be examined on microscopic scale. The diaphragm 21, whose aperture is, for example, several tens of microns, makes it possible to avoid detection of the light derived from the non-focussed beams concerning the object to be examined. The effect of defocussing concerning the formation of images is shown on FIG. 2.

F0 is referred to as the focussing point of the beam after passing through the focussing means 14.

When the object 16 is placed inside the focal plane of the focussing means 14, the conjugated point of the point F0 is the point F'0 situated inside the plane of the diaphragm 21. The dimension of the luminous spot inside this plane is then minimal and the energy collected by the detection system 20 is maximal.

When the object is moved away from the focal plane of the focussing means 14, the image F'1 of the luminous beam reflected by the object is distanced from F'0. The luminous spot inside the plane of the diaphragm 21 is enlarged and the luminous energy collected by the detection system 20 is much less than it was previously.

In the presence of such a diaphragm 21, the microscope is used in the actual confocal mode. The diaphragm 21 enables a gain in the resolution of the final image of approximately a factor of 1.4 to be obtained with respect to the resolution of an image obtained without using a diaphragm.

The means used to obtain the scanning of the beam on the object 16 are not shown on FIG. 1.

In this type of device, the field depth is very small, namely in the order of from 0.3 to 0.5 $\mu$m.

On the basis of using the device shown on FIG. 1, it is possible to carry out extended field in-depth optical image formation. It merely requires that cuts be made at successive distant altitudes of, for example, 0.5 $\mu$m. In a known way, a scanning is made of the object 16 at an altitude z1 and then the object 16 is moved into the axis z of the device to an altitude z2 where a new scanning is carried on, and so on.

This method is described in section 5, page 123 of the book entitled "Theory and Practice of Scanning Optical Microscopy" written by Tony Wilson, Colin Sheppard, Academic Press in 1984.

The field depth obtained is then limited by the number of successive cuts made.

This method presents the drawback of requiring several acquisitions of successive images, which considerably reduces the optical image formation speed of the microscope. According to the known devices currently used, the formation of the image from a cutting of the object 16 (field depth 0.5 $\mu$m) may take up to 2 s. In the case of a synchronized device with a picture monitor, the image formation time is the scanning time of a frame of the picture monitor. These times must be multiplied by the number of the desired successive images corresponding to the desired extended field depth.

The present invention makes it possible to carry out in-depth scanning optical microscopy of the extended field in a single scanning of the object 16 to be examined by the beam. Sequential acquisition is avoided and thus the acquisition speed of a complete image is considerably reduced.

SUMMARY OF THE INVENTION

The precise object of the present invention is to provide a method for the scanning confocal light-optical microscopic and in-depth examination of an extended field. The method consists of:

forming a principal luminous beam made up of a plurality of secondary luminous beams being distinguished from each other by at least one of their characteristics, directing the principal luminous beam towards focussing means, focussing on the object to be examined by means of focussing means at points of different altitude the various secondary luminous beams, sending the secondary luminous beams reflected by the object to be examined towards a detection system, detecting the light intensity of the secondary beams, digitally analysing and processing the signals detected, carrying out a scanning of the principal luminous beam as regards all the object to be examined.

According to one characteristic of the method, the secondary luminous beams are distinguished from each other by virtue of their amplitude which is temporally modulated in a characteristic way for each of the secondary beams.

The present invention also involves a device to implement the method. This device comprises:
a luminous source delivering a principal luminous beam extending towards the object to be examined,
spatial filtering and focussing means,
focussing means focussing said beam on the object to be studied,
a separating plate returning a luminous beam reflected by the object to be examined,
a detection system delivering a signal onto an output and comprising a diaphragm placed at a conjugated point of a focussing point of the focussing means,
a digital analysis and processing system having one input connected to the output of the detection system.

The luminous source is polychromatic and the principal luminous beam is made up of a plurality of secondary beams of different wave length. The focussing means present axial chromatics.

This device does not distinguish between the various focussing planes and delivers an image where the relief of the object 16 to be examined does not appear: the surface details appear on the same plane, irrespective of the altitude of the surface in question.

In one preferred embodiment, the device comprises:
a lateral dispersion optical system placed on the path of the beam reflected by the object to be examined returned by the separating plate and spatially separating the secondary beams of different wave length which constitute said reflected beam,
detection systems suitable for each receiving a secondary beam separated by the lateral dispersion optical system, each detection system comprising a diaphragm placed at a conjugated point of the focal point of the focussing means, the detection systems delivering signals onto outputs connected to inputs of a system for analysing and processing said signals.

This last-described embodiment enables the relief of the object to be examined to be re-established.

The extent of the field depth corresponds to the axial chromatic dispersion of the focussing means and to the chromatic extension of the polychromatic luminous source.

According to one preferred embodiment, the lateral dispersion optical device is a diffraction grid.

According to another embodiment, the lateral dispersion optical device is a prism.

In another embodiment, the device according to the invention comprises on the path of the principal beam between the luminous source and the filtering and focussing means:
means to spatially separate the various secondary beams,
means to temporally modulate the amplitude of each secondary beam at a particular frequency,
means to superimpose the various secondary beams in order to reform a principal beam and so as to direct said principal beam towards the spatial filtering and focussing means.

In one preferred embodiment, the means to spatially separate the various secondary beams include separating plates and a mirror for returning the residual principal beam after passage of the separating plates forming a secondary beam; the means to superimpose the secondary beams include separating plates and a mirror for returning the secondary beam derived from a first separation of a secondary beam from the principal beam; the separating plates only reflect one of the secondary beams and not the other beams.

In another embodiment, the means to spatially separate the secondary luminous beams include a diffraction grid and a lens so that the secondary luminous beams after passage of said lens are parallel and the means to superimpose the secondary beams comprise a lens traversed by said secondary beams and a diffraction grid returning the superimposed beams towards the spatial filtering and focussing means.

In one preferred embodiment, the means to temporally modulate the amplitude of each secondary beam are acousto-optical elements.

In one preferred embodiment, the polychromatic luminous source is a laser emitting beams on at least two different wave lengths.

In a further embodiment, the polychromatic luminous source is constituted by at least two lasers emitting beams of different wave lengths.

In another embodiment, the device according to the invention comprises a luminous source delivering a principal luminous beam extending towards the object to be examined.

It also includes:
means to divide the principal luminous beam into a plurality of secondary beams and in order to send the secondary beams to means to temporally modulate the amplitude of each secondary beam at a particular frequency,
focussing means allowing for a different focussing of each secondary beam,
means for recombining and sending back the secondary beams, a principal beam resulting from recombination,
a first focussing system,
a second focussing system enabling the secondary beams each to be focussed at different altitudes, and a separating plate, placed between the luminous source and the separation means of the principal beam on the path of a beam reflected by the object to be examined, the reflected beam having retraversed in the opposite direction the various elements of the device, sends said reflected beam towards a detection system by means of a filtering and focussing system.

In one embodiment of this last device, the modulation of the amplitude of each secondary beam is effected at the same frequency for each of the secondary beams, the phase of each of the modulations being different.

In one embodiment of this last device, the modulation of the amplitude of each secondary beam is effected at a different frequency for each of the secondary beams.

BRIEF DESCRIPTION OF THE DRAWINGS

Other characteristics and advantages of the invention shall be more readily understood from a reading of the following description, given purely by way of illustration and being in no way restrictive, in which:

FIG. 5 shows a variant of the device according to the invention;

FIG. 7 shows a device according to the invention using a monochromatic luminous source.

DETAILED DESCRIPTION OF THE PREFERRED EMBODIMENTS

Figure 1:
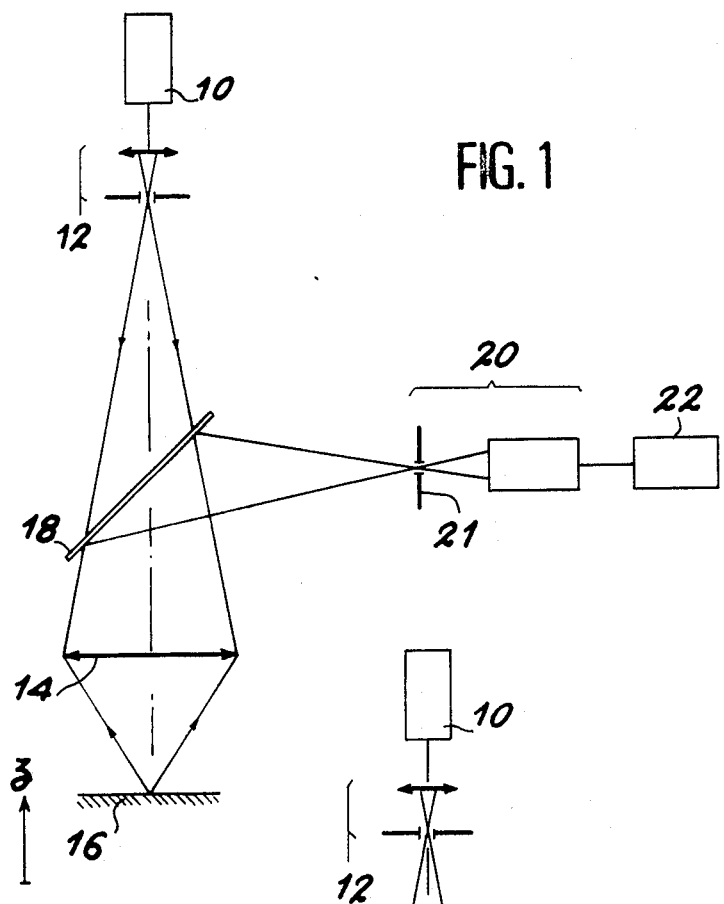
FIGS. 1 and 2 show a diagrammatic representation of a prior art focussing system.
Figure 2:
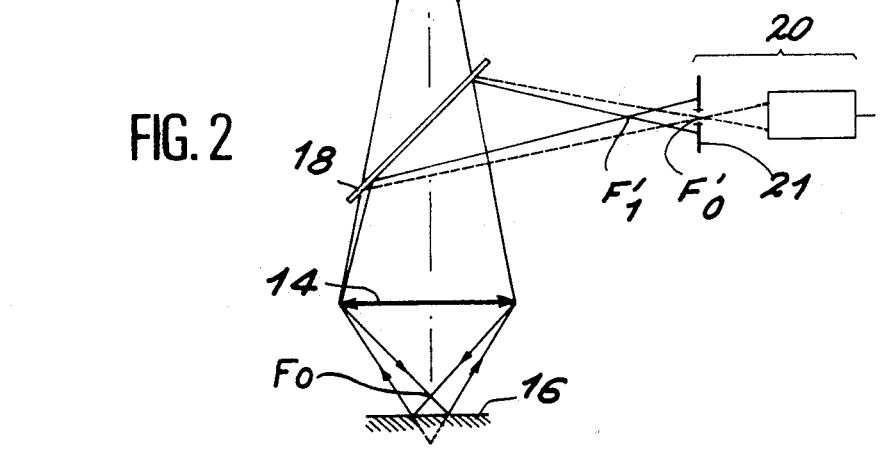
Figure 3:
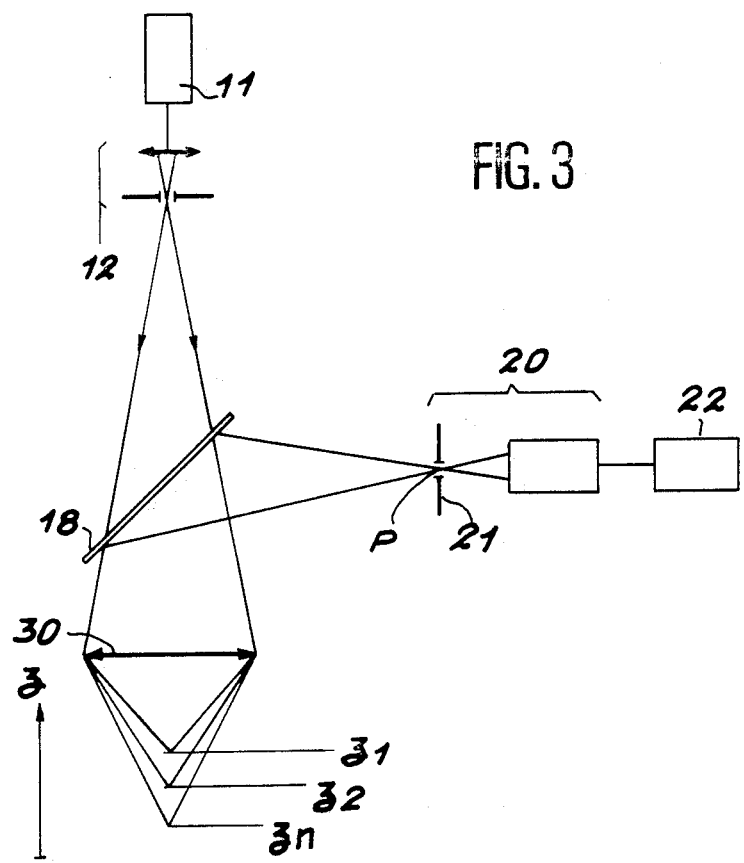
FIG. 3 shows a device according to the invention.

FIG. 3 shows a device according to the invention. A polychromatic luminous source 11 delivers a principal luminous beam made up of a plurality of secondary beams. The luminous source 11 may be a laser whose active material is Argon and which, for example, emits radiations on several wave lengths. The luminous source may be the combining of several lasers emitting radiations with different wave lengths, for example. The principal beam is focussed and spatially filtered by focussing and filtering means 12 so as to obtain a beam whose intensity is uniformly distributed over the section. These focussing and filtering means 12 are constituted by, for example, a diaphragm and an achromatic lens, the aperture of the diaphragm being situated at the focussing point of the achromatic lens.

The principal beam is then refocussed onto the object to be examined (not shown) by focussing means 30 presenting axial chromatics, for example by a lens embodied by means of lenses made from the same type of glass. The various secondary beams do not have the same focussing point; the focussing points are distributed over altitudes $z_1, z_2, \ldots, z_n$, n a whole number being equal to the number of secondary beams present in the principal beam. The axis z representing the axis of the altitudes of the focussing points is merged with the axis of the device.

The secondary beams are reflected by the object to be examined and are sent back by a separating plate 18 to detection means 20.

At the time of scanning the object to be examined by the principal beam, for each explored point, only one secondary beam correctly focussed on the surface of the object to be examined is refocussed at the conjugated point P of its focal point. On the other hand, each beam which is focussed on the surface of the object to be examined is refocussed by the focussing means 30 at the same focussing point, which is the conjugated point P.

The presence of a diaphragm 21 forming part of the detection means 20 makes it possible to filtrate the secondary beams which are not correctly focussed on the surface of the object to be examined.

The detection system delivers on one output a signal which is digitally analysed and processed by processing and analysis means 22.

This device processes on an equality base all the beams correctly focussed on the surface of the object to be examined. It does not provide information of the relief of the object, but solely concerns the state of its surface over a certain thickness of, for example, 0.5 $\mu m$.

Figure 4:
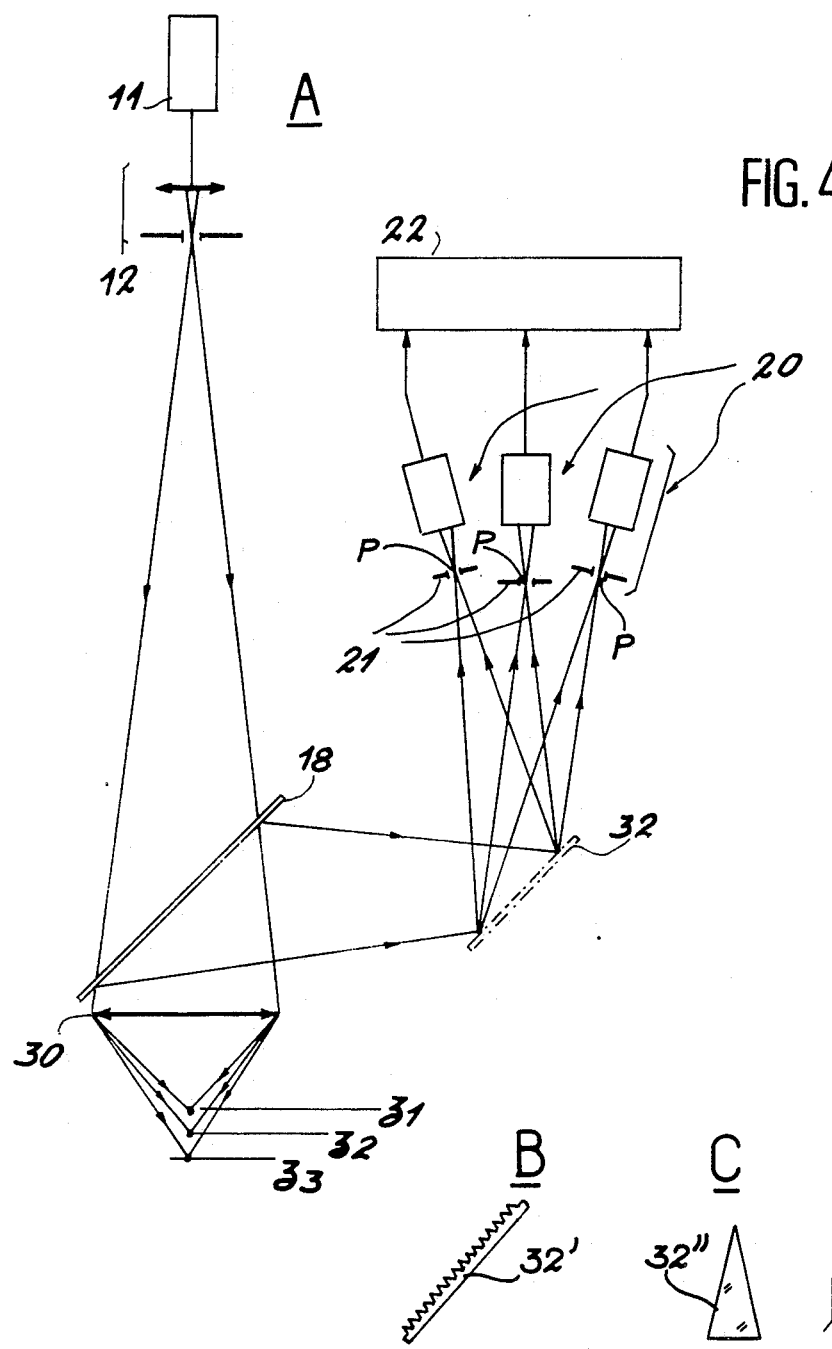
FIG. 4 shows a variant of the device according to the invention.

So as to be able to analyse and process the relief of the object to be examined, a variant of the device according to the invention is proposed at FIG. 4A.

For means of simplicity and by no means restrictive, FIG. 4A shows three secondary beams focussed at altitudes $z_1$, $z_2$ and $z_3$.

A lateral dispersion optical system 32 is placed on the path of the secondary beams reflected by the object to be examined and returned by the separating plate 18. The various secondary beams are thus separated spatially and each are sent onto a detection system 20.

FIG. 4B shows that the lateral dispersion system 32 may be a diffraction grid 32'. FIG. 4C shows that the lateral dispersion system 32 may be a prism 32".

Each of the detection systems 20 comprises a diaphragm 21 placed at the conjugated point P of the focussing points of the various secondary beams.

The detection means 20 deliver on an output a signal which is digitally analysed and processed by analysis and processing means 22.

After digital processing and for each explored point of the object to be examined, this device makes it possible to restore the altitude of the secondary beam correctly focussed on the surface of the object.

It is possible for a further variant of the device according to the invention to reach the same result. FIG. 5 shows that the secondary beams contained in the principal beam delivered by the luminous source 11 are separated spatially by means 34. For reasons of simplicity and by no means restrictive, this figure only shows three secondary beams. Each secondary beam is amplitude-modulated at a particular frequency by modulation means 36. The secondary beams are then superimposed so as to reform a principal beam by means 38 of the same kind as those used to separate the secondary beams. These superimposition and spatial separation means 34, 38 are separating plates processed in such a way that they only reflect, for example, one of the secondary beams and not the other beams.

The detection system 20 comprises means to demodulate each of the secondary beams returned by the separating plate 18.

Figure 6:
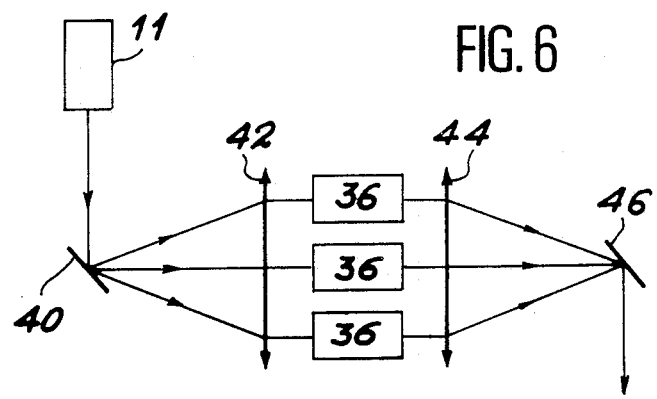
FIG. 6 shows a device for the spatial separation of the secondary luminous beams.

FIG. 6 shows other means able to be used to separate the secondary beams, to amplitude-modulate them and recombine them.

The secondary beams constituting the principal beam derived from the luminous source are spatially separated by means of a diffraction grid 40; a lens 42 makes it possible to render parallel the propagation directions of the secondary beams (three of these beams are shown for reasons of simplicity and are in no way restrictive). Each secondary beam is temporally amplitude-modulated at a particular frequency by means 36. For example, these modulation means 36 can be acousto-optical elements.

The secondary beams are again superimposed by a lens 44 and a diffraction grid 46 and sent to the spatial filtering and focussing means 12 (not shown on FIG. 6).

A further embodiment of a device according to the invention is shown on FIG. 7.

A luminous source 10, such as a laser, delivers a principal beam.

Means 52 to divide the principal beam into a plurality of secondary beams of equal intensity is placed on the path of the principal beam.

These means are, for example, separating plates. After passage of these separating plates, the residual principal beam, also forming a secondary beam, is reflected by a mirror 53.

For reasons of simplicity but by no means restrictive, this figure only shows three secondary beams.

Each secondary beam has its amplitude temporally modulated at a particular frequency by modulation means 36, which may, for example, be acousto-optical elements.

After modulation, each secondary beam traverses focussing means 51, for example lenses of different focal distance, allowing for different focussing of each of the secondary beams.

The various secondary beams are recombined so as to reform a principal beam by the recombination means 52, a reflecting mirror 53 allowing for recombination with the other secondary beams of the secondary beam derived from the first one traversed by the principal beam of a semi-transparent plate.

The principal beam made up of the amplitude-modulated secondary beams traverses a first focussing system 54 and then a second focussing system 56. Thus, the various secondary beams are focussed at different altitudes (z1, z2, z3).

The secondary beams are reflected by the object to be examined (not shown) and retraverse in the opposite direction the various elements of the device. A separating plate 50 enables the reflected beam to be sent back to a filtering and focussing system 12. Only the secondary beams focussed on a surface of the object to be examined are transmitted to the detection system 20. The signals delivered on an output by the detection system 20 are then digitally analysed and processed by an analysis and processing system 22.

What is claimed is:

1. Method for the scanning confocal light-optical microscopic and in-depth examination of an extended field, wherein:
    a principal luminous beam is formed constituted by a plurality of secondary luminous beams possessing characteristics, the secondary luminous beams distinguished from each other by virtue of at least one of their characteristics,
    by means of focussing means, the various secondary luminous beams are focussed onto the object to be examined at points of different altitude,
    the secondary luminous beams reflected by the object to be examined are sent to a detection system,
    the light intensity of the secondary beams is detected,
    the signals detected are digitally analysed and processed,
    a scanning of the principal luminous beam is carried out as regards all the object to be examined.

2. Method according to claim 1, wherein the secondary luminous beams are distinguished from each other by virtue of their wave length which differs for each secondary beam.

3. Method according to claim 1, wherein the secondary luminous beams are distinguished from each other by virtue of their amplitude which is chartacteristically temporally modulated for each secondary beam.

4. Device for the scanning confocal light-optical microscopic and in-depth examination of an extended field comprising:
    a luminous source delivering a principal luminous beam extending towards the object to be examined:
    spatial filtering and focussing means,
    focussing means focussing said beam onto the object to be examined,
    a separating plate returning a luminous beam reflected by the object to be examined,
    a detection system delivering a signal on an output and comprising a diaphragm placed at a conjugated point of a focussing point of the focussing means,
    a digital processing and analysis system having an input connected to the output of the detection system, namely a device wherein:
    the luminous source is polychromatic and the principal luminous beam is made up of a plurality of secondary beams of different wave lengths and wherein the focussing means present axial chromatics.

5. Device according to claim 4, wherein it includes in addition:
    a lateral dispersion optical system placed on the path of the beam reflected by the object to be examined returned by the separating plate and spatially separating the secondary beams of different wave length which constitute said reflected beam,
    detection systems suitable for each system to receive a secondary beam separated by the lateral dispersion optical system, each detection system comprising a diaphragm placed at a conjugated point of a focal point of the focussing means, the detection systems delivering signals on outputs connected to inputs of a system for the processing and analysis of said signals.

6. Device according to claim 5, wherein the lateral dispersion optical system is a diffraction grid.

7. Device according to claim 5, wherein the lateral dispersion optical system is a prism.

8. Device according to claim 4, wherein it includes on the path of the principal beam between the luminous source and the filtering and focussing means:
    means to spatially separate the various secondary beams,
    means to temporally modulate the amplitude of each secondary beam at a particular frequency,
    means to superimpose the various secondary beams so as to reform a principal beam and in order to direct said principal beam towards the spatial filtering and focussing means.

9. Device according to claim 8, wherein the means to spatially separate the various secondary beams comprise separating plates and a mirror for reflecting the residual principal beam after passage of the separating plates forming a secondary beam, and wherein the means to superimpose the secondary beams comprise separating plates and a mirror for returning the secondary beam derived from a first separation of a secondary beam from the principal beam, and wherein the separating plates only reflect one of the secondary beams and not the other beams.

10. Device according to claim 8, wherein the means to spatially separate the secondary luminous beams comprise a diffraction grid and a lens so that the secondary luminous beams, after passage of said lens, are parallel and wherein the means to superimpose the secondary beams include a lens traversed by said secondary beams and a diffraction grid sending the superimposed beams back towards the spatial filtering and focussing means.

11. Device according to claim 8, wherein the means to temporally modulate the amplitude of each secondary beam are acousto-optical elements.

12. Device according to claim 4, wherein the polychromatic luminous source is a laser emitting beams on at least two different wave lengths.

13. Device according to claim 4, wherein the polychromatic luminous source is constituted by at least two lasers emitting beams of different wave lengths.

14. Device for the scanning confocal light-optical microscopic and in-depth examination of an extended field comprising a luminous source delivering a principal luminous beam extending towards the object to be examined, wherein it includes:
    means to divide the principal luminous beam into a plurality of secondary beams and in order to send the secondary beams to means to temporally modulate the amplitude of each secondary beam at a particular frequency, focussing means allowing for a different focussing of each secondary beam, means for recombining and returning the secondary beams, one principal beam resulting from this recombination, a first focussing system, a second focussing system allowing for focussing at different altitudes of each secondary beam, and wherein a separating plate, placed between the luminous source and the separation means of the principal beam on the path of a beam reflected by the object to be examined, namely a reflected beam having retraversed in the opposite direction the various elements of the device, sends said reflected beam towards a detection system by means of a filtering and focussing system.

15. Device according to claim 14, wherein the modulation of the amplitude of each secondary beam is carried out at the same frequency for each of the secondary beams, the phase of each modulation being different.

16. Device according to claim 14, wherein the modulation of the amplitude of each secondary beam is effected at a different frequency for each secondary beam.

* * * * *